June 23, 1936.    J. O. ALMEN ET AL    2,045,557
CLUTCH MECHANISM
Filed May 19, 1934    2 Sheets-Sheet 1

Inventors
John O. Almen &
Andrew Laszlo
By Blackmore, Spencer & Flint
Attorneys

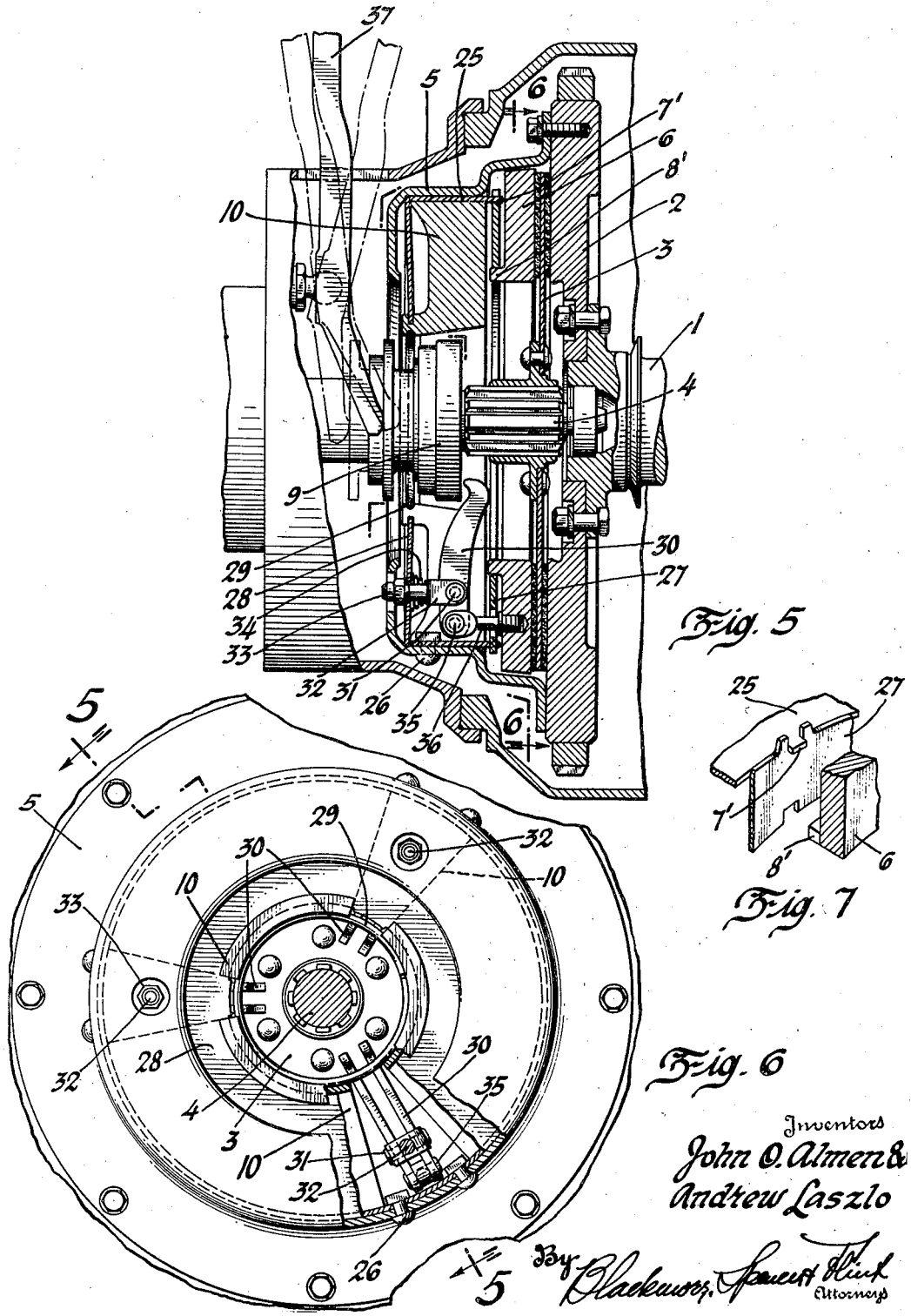

Patented June 23, 1936

2,045,557

UNITED STATES PATENT OFFICE 2,045,557

CLUTCH MECHANISM

John O. Almen, Royal Oak, and Andrew Laszlo, Detroit, Mich., assignors to General Motors Corporation, Detroit, Mich., a corporation of Delaware Application May 19, 1934, Serial No. 726,440

8 Claims. (Cl. 192—105)

This invention relates to friction clutches of the centrifugal type adapted automatically to transmit the drive from a driving shaft to a driven shaft, at all driving shaft speeds in excess of a certain minimum.

It relates particularly to such clutches in which provision is made whereby the clutch may be manually engaged when the centrifugal force is insufficient or not available for automatic engagement, or manually disengaged when the clutch would otherwise be centrifugally engaged, of the type shown in a copending application Ser. No. 710,792 wherein the masses which are subject to movement under the influence of centrifugal force are effective to permit other forces to become operative to engage the clutch members, rather than of themselves providing the engaging pressure, and whereby the effort required to disengage the members is of reasonable and constant proportions and independent of the centrifugal forces which vary as the square of the speed.

According to the present invention it has been found that a simplification and economy of parts can be effected by the employment of dished sheet steel springs of the so-called Belleville washer type to provide the clutch engaging pressure and the means for retracting the flyweights.

It has further been discovered that by a suitable proportioning of the extent to which the Belleville washer is dished to the thickness of the material of which it is made, a spring in which substantially no change in load is required for a change in the deflection of the spring within certain limits, or what might be termed a spring having a substantially zero rate characteristic, between certain limits of deflection, can be obtained.

A spring having such characteristics has been found of very great advantage when correctly employed in a clutch of the foregoing type.

One object of the invention is a centrifugal clutch of the foregoing kind wherein the masses which are subject to movement under the influence of centrifugal force have such movement resiliently resisted by a spring of the Belleville washer type, whereby an economy of parts is effected.

Another object of the invention is to provide such a clutch in which engagement of the clutch members is effected by the pressure of spring means of the Belleville washer type.

Another object of the invention is a centrifugal clutch in which a single spring of the Belleville washer type performs the dual function of a flyweight retracting spring and a clutch engaging spring.

A further object of the invention is a clutch in which the engagement of the clutch members is effected by the pressure of spring means having an inherent, substantially zero rate throughout the whole or part of its operating range.

In the drawings

Figure 5 is a view, partly in section, on line 5—5 of Figure 6 of an alternative centrifugal clutch according to the invention, wherein separate Belleville washer spring means are used for flyweight retracting means and for clutch engaging means, the parts being shown in the automatically engaged position.

Figure 6 is a view, partly in section and partly broken away, approximately on line 6—6 of Figure 5.

Figure 7 is a perspective view of a part of Figure 5 showing the manner in which the Belleville washer spring and the pressure plate which is driven thereby are properly centered and driven.

Figure 1:
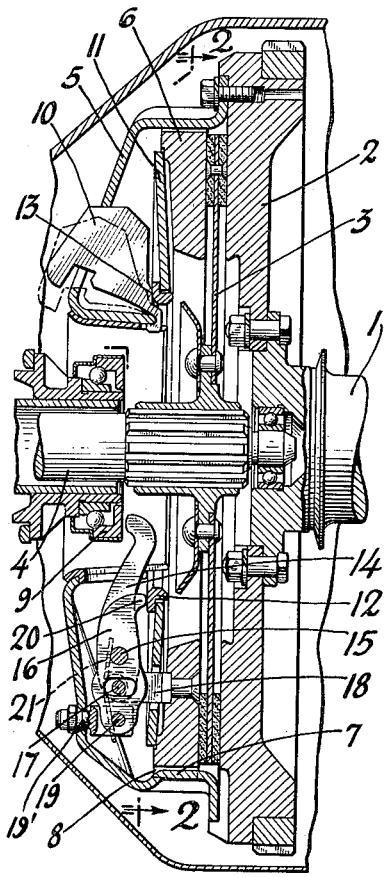
Figure 1 is a view, partly in section, on line 1—1 of Figure 2 of the preferred form of a centrifugal clutch according to the invention, wherein but a single Belleville washer spring performs the dual function of flyweight retracting means and clutch engaging means, the parts being shown in the automatically engaged position.
Figure 2:
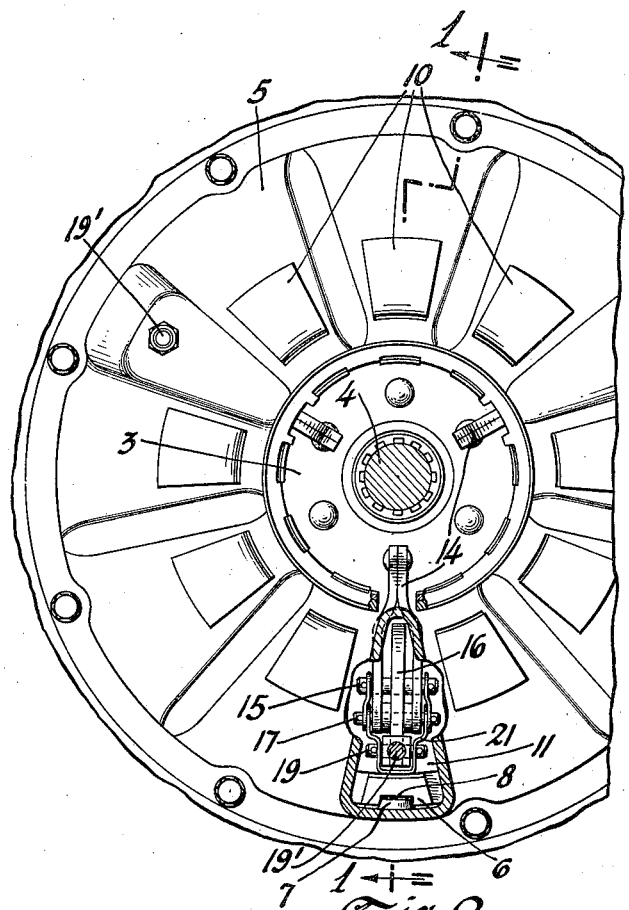
Figure 2 is a view partly in section, and partly broken away, approximately on line 2—2 of Figure 1.

Referring now to Figures 1 and 2, the driving shaft 1 is provided with the driving disc member 2 which in the examples illustrated, is an engine flywheel. 3 is the driven disc member splined on the driven shaft 4. Rigidly bolted to the driving disc is the clutch cover 5.

The pressure plate 6 is driven from the clutch cover 5 through suitable indentations 7 engaging grooves 8 in the periphery of the pressure plate, and is capable of axial sliding movement relative to the clutch cover, being yieldingly urged towards the driven disc 3 which is frictionally gripped between the pressure plate 6 and the driving disc 2, to transmit the drive from the driving shaft 1 to the driven shaft 4.

The position of the pressure plate is controlled manually by movement of the throw out sleeve 9 into different positions axially of the driven shaft 4, or automatically by the centrifugal movement of a suitable number of flyweights 10, suitably arranged around the clutch.

The throw out sleeve and the flyweights are conjointly operatable to control the position of the pressure plate 6 through the medium of a control lever mechanism, later to be described.

The flyweights 10 are such that they have a centrifugal moment about their hinge points when the driving shaft is running, and are hinged directly on the clutch cover 5, thus dispensing with the need for a physical hinge pin.

Between the pressure plate 6 and the flyweights 10 is placed a Belleville washer 11 with the outer edge of one face bearing against the pressure plate 6 and the inner edge of the other face provided with a reinforcing or equalizing ring 12, bearing against a lip 13 on each of the flyweights 10.

The Belleville washer spring 11 is both a flyweight retracting spring and a clutch engaging spring.

The control lever mechanism constitutes a "toggle" mechanism between the throw out sleeve 9 and the pressure plate 6 with the Belleville washer spring 11, and consists of clutch throw out levers 14, suitably spaced around the clutch, and fulcrumed intermediately of their ends on pins 15, on and intermediate of the ends of auxiliary levers 16.

The outer ends of the throw out levers 14 are pivotally connected to the pressure plate through pivot pins 17 on pivot pin support members 18, extending through the Belleville washer spring 11. The inner ends of the throw out levers extend into the path of movement of the throw out sleeve 9.

The auxiliary levers 16 are pivoted on pins 19 on pivot pin support members 19' suitably mounted on the clutch cover 5, and extend radially inwards therefrom to terminate in a lip 20 in bearing engagement with the reinforcing or equalizing ring 12, of the Belleville washer spring 11.

The parts being assembled and the driving and driven shafts stationary, with the throw out sleeve 9 in the position shown, the lengths of the lever arms are such, that the turning moment of the pressure of the Belleville washer spring 11 at 15 on the throw out levers 14 about the throw out sleeve 9 as applied through the auxiliary levers 16 at 20 about their pivot pins 19, is greater than the turning moment of the pressure of the Belleville washer spring 11 in the opposite direction at 15 on the throw out levers 14 about the throw out sleeve 9 as applied through the pressure plate on the throw out levers 14 at 17 about the throw out sleeve, and the clutch is disengaged.

In the automatic movement of the parts from the disengaged position to the engaged position illustrated, the flyweights have been thrown outwards providing a centrifugal turning moment opposing the turning moment of the Belleville washer spring 11 on the auxiliary levers 16 at 20 about their pivot pins 19, so that the resultant turning moment at 15 on the throw out levers 14 from this source is reduced, and the clutch is engaged.

A further slight movement of the flyweights outward beyond the point where the clutch has become engaged, permits a further movement of the lips 20 of auxiliary levers 16 towards the pressure plate, under the influence of the antirattle springs 21, whereby the throw out levers 14 through pins 15 are moved about pins 17 away from the face of the throw out sleeve 9, relieving the latter of all loading.

The movement of the parts from the engaged position to the disengaged position as the speed of the driving disc becomes sufficiently low, is a reversal of the above described action. The above described operation of the parts constituting the centrifugal automatic engagement and disengagement of the clutch discs, all takes place with the throw out sleeve 9 in the position illustrated.

It will be appreciated that, at any time, by moving the throw out sleeve 9 to the right and towards the pressure plate in Figure 1, the pressure plate 6 will be moved to the left away from the driven disc 3 and the clutch disengaged through the levers 14 in pivoting about 15, while, if at any time the throw out sleeve 9 is moved to the left in Figure 1, the pressure plate 6 will be moved to the right against the driven disc 3 and the clutch engaged by the Belleville washer spring 11, since the levers 14 having no abutment, will be incapable of preventing such engagement.

The position of the throw out sleeve shown in Figure 1, is that of the throw out sleeve for automatic engagement and disengagement, while the other described positions of the throw out sleeve constitute positions taken up by the throw out sleeve when the clutch is manually operated.

Referring now to Figures 5 and 6, showing an alternative form of centrifugal clutch according to the invention, the parts 1, 2, 3, 4, 5, 6, 9, and 10 are substantially the same as the corresponding parts shown in Figures 1 and 2.

In these figures a sleeve 25 is provided within the clutch cover 5 and is locked therein by bolts 26.

The outer edge of one face of a Belleville washer spring 27 abuts on that end of the sleeve 25 adjacent to the pressure plate 6, while the inner edge of the other face of the Belleville washer spring 27 bears against the pressure plate 6.

The Belleville washer spring is provided with grooves or slots on its outer and inner peripheries engaging tenons 7' and 8' on the sleeve 25, and the pressure plate 6 respectively, whereby the Belleville washer spring and the pressure plate which is driven thereby are properly centered and driven from the clutch cover 5 with a minimum of frictional resistance to axial movement of the pressure plate.

Between the other end of the sleeve 25 and the clutch cover 5, the outer periphery of another Belleville washer spring 28 is clamped.

The flyweights 10 suitably spaced around the clutch have inner peripheral rim portions, the outer peripheries of which are grooved to fit and grip the inner periphery of the Belleville washer spring 28 on which they are retained in rigid relationship by a spring ring 29; they are suspended entirely clear from the sleeve 25 when the driving shaft is stationary.

When the driving shaft is running, the weights have a centrifugal moment and there is a resultant spring deflecting force capable of deflecting the inner periphery of the Belleville washer spring—relatively to its clamped outer periphery—towards the pressure plate. Any such deflection will of course cease when the flyweights 10 come in contact with the sleeve 25 which thus serves as a limit stop.

The Belleville washer spring 27 is a clutch engaging spring, and the Belleville washer spring 28 is a flyweight retracting spring.

Both the throw out sleeve 9 and the flyweights 10 are conjointly operatable to control the position of the pressure plate 6 through the medium of a control lever mechanism consisting of clutch throw out levers 30, suitably spaced around the clutch, and pivotally connected to the Belleville washer spring 28, intermediately of their ends, through pivot pins 31 on pivot pin support members 32, adjustably connected to the Belleville washer spring 28 by nuts 33. Suitable anti-rattle springs 34 are interposed between the pivot pin support members 32 and the Belleville washer spring 28.

The outer ends of the throw out levers 30 are pivotally connected to the pressure plate through pivot pins 35, on pivot pin support members 36, extending through the Belleville washer spring 27. The inner ends of the throw out levers extend into the path of movement of the throw out sleeve 9.

The parts being assembled, and the driving and driven shafts stationary with the throw out sleeve 9 in the position shown, the turning moment of the pressure of the Belleville washer spring 28, at 31 on the throw out levers 30 about the throw out sleeve 9, is greater than the turning moment of the pressure of the Belleville washer spring 27 in the opposite direction at 35 on the throw out levers 30 about the throw out sleeve 9, and the clutch is disengaged.

In the automatic movement of the parts from the disengaged position to the engaged position illustrated, the flyweights have been thrown outwards, with a centrifugal turning moment providing a force having a moment opposing the turning moment of the Belleville washer spring 28 at 31 on the throw out levers 30 about the throw out sleeve 9, so that the resultant turning moment on the levers 30 from this source is reduced, and the clutch is engaged by the greater moment of the Belleville washer spring 27 at 35 on the throw out levers 30.

As shown in Figure 5 the flyweights have moved into contact with the sleeve 25. This corresponds to a position of the flyweights outwards slightly beyond the point where the clutch has become automatically engaged, and permitting a further movement of pins 31 therebeyond, under the influence of the anti-rattle springs 34, whereby the throwout levers 30 move about pins 35, away from the face of the throwout sleeve 9, thus automatically relieving the latter of all loading.

The movement of the parts from the engaged position illustrated to the disengaged position as the speed of the driving disc becomes sufficiently low is a reversal of the above described action.

The above described operation of the parts, constituting the centrifugal automatic engagement and disengagement of the clutch discs, all takes place with the throw out sleeve 9 in the position illustrated.

It will be appreciated that at any time by moving the throw out sleeve 9 to the right and towards the pressure plate in Figure 5, the pressure plate 6 will be moved to the left away from the driven disc 3, and the clutch will be disengaged through the levers 30 in pivoting about 31, while if at any time the throw out sleeve 9 is moved to the left in Figure 5, the pressure plate 6 will be moved to the right, against the driven disc 3, and the clutch engaged by the Belleville washer spring 27—since the levers 30, having no abutment, will be incapable of preventing such engagement.

The position of the throw out sleeve shown in full lines in Figure 5 is that of the throw out sleeve for automatic engagement and disengagement, while the other described positions of the throw out sleeve constitute positions taken up by the throw out sleeve while the clutch is manually operated.

In both of the alternative forms of a clutch according to the invention, the position of the throw out sleeve 9 may be controlled in any suitable way as through a clutch yoke lever 37 shown in Figure 5. As indicated in Figure 5, the lever is moved progressively in the same direction, to move the throw out sleeve from a broken line position in which the clutch is manually engaged to the full line position in which the throw out sleeve is in position for automatic engagement and disengagement of the clutch and to a third position in which the clutch is at all times disengaged, and vice versa.

The engagement and disengagement of the clutch is not dependent on any variation in spring pressure consequent on deflection of the Belleville washer springs—if the Belleville washers have a zero-rate there may be none,—but is solely dependent on the relative turning moments to which, either through the throw out sleeve 9 or the weights 10 and the Belleville washer springs, the various parts of the control mechanism are subjected.

It will be noted also that in both the examples of a clutch according to the invention, the position of the pressure plate is controlled by the throw out levers whose position is controlled differentially by manual and speed responsive means.

Figure 3:
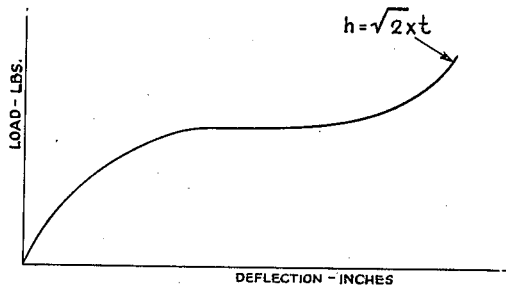
Figure 3 is a curve showing how the deflection of the Belleville washer varies with the load thereon.
Figure 4:
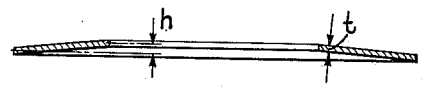
Figure 4 is a diametrical sectional view of the Belleville washer.

Referring now to Figures 3 and 4, it has been found that when in a Belleville washer type spring, the free height $h$ (the extent to which the Belleville washer is dished), is equal substantially to the $$\sqrt{2} \times t$$

(the thickness of the material of which it is made), a spring with a substantially zero rate characteristic, or one in which substantially no change in load is required for a change in the deflection of the spring, within certain limits, is obtained.

A spring with such characteristics, which cannot be made an inherent property of any other known type of spring, has many useful applications and is of very specific advantage when used in a centrifugal clutch, since it permits of a varying degree of spring deflection for a given spring loading, which provides for a variation in the position of the flyweights or control lever mechanism relatively to the engaged and disengaged positions of the clutch consequent upon wear of the parts with negligible change in the spring loading of the clutch. This enables the centrifugal flyweights to deflect or permit deflection of the spring farther with increasing speed beyond that speed at which the clutch has become engaged, without increasing the spring loading on the clutch discs. It thus follows that the pressure required to move the throw out sleeve to disengage the clutch, whether applied manually or otherwise, may be of a substantially constant amount irrespective of the speed of rotation and may not increase with increased spring deflection consequent upon higher speed and greater centrifugal force on the flyweights, as would otherwise be the case.

Expressed otherwise, the flyweights can be permitted to move beyond the point where they have loaded the clutch to its designed capacity without increasing the spring loading on the clutch.

According to the invention, the Belleville washer spring 11 in the preferred embodiment shown in Figure 1, and the Belleville washer spring 27 in the alternative embodiment shown in Figure 5, have a "zero rate" characteristic within their working range, of the kind described.

The Belleville washer spring 11 in Figure 1, and 27 in Figure 5, may be preloaded to that load at which it has a zero rate, and with the minimum deflection at that load when the throw out sleeve is in the manually engaged position, with the driving shaft stationary and centrifugal force inoperative on the flyweights. In this case the Belleville washer will be farther deflected within its "zero rate" range when the throw out sleeve is moved to a position for automatic operation, and automatic engagement will occur with still farther deflection within the "zero rate" range. The amount by which the spring is deflected within its "zero rate" range to its position for automatic engagement represents provision for wear, since until engagement occurs before the spring has been deflected sufficiently to reach its "zero rate" range, the clutch will be loaded to its designed capacity.

When the movement of the pressure plate automatically from a disengaged position to its engaged position takes place within the "zero rate" range of the spring a quick engagement of the clutch occurs with a minimum change in speed of the driving member.

Alternatively, and to the extent that the preloading of the Belleville washer spring is less than the load at which it has a "zero rate", there will be the advantage that the static friction at the pivot pins of the linkages will be reduced, increasing the controllability of the clutch, accompanied, however, by less provision for wear, if the capacity of the clutch is to be maintained.

It will be apparent that a clutch constructed in accordance with the invention has several advantages. There is the advantage that a spring having an inherent "zero rate" is employed. There is a minimum of parts. There is a uniform loading, since the Belleville washer type spring presses evenly on a circular region of contact on the pressure plate, thereby obviating local distortion. The axial length is reduced as compared with a clutch in which the longer, conventional coil springs are used. The Belleville washers themselves equalize the efforts applied by the several throw out levers and flyweights, thereby reducing the number of throw out levers required, and eliminating the need for separate equalizing means.

We claim:

1. In a clutch mechanism, a driving member, a driven member, and resilient means yieldingly urging the driving member and the driven member into driving engagement, said resilient means having an inherent, substantially zero rate, within its operating range.

2. In a clutch mechanism, a driving member, a driven member, a pressure plate to clamp said members together, and resilient means to move said pressure plate towards clutch engaging position, said resilient means having an inherent, substantially zero rate, within its operating range.

3. In a clutch mechanism, a driving member, a driven member and a Belleville washer spring yieldingly urging the driving member and the driven member into driving engagement, said Belleville washer spring having an inherent, substantially zero rate, within its operating range.

4. In a clutch mechanism, a driving member, a driven member, a pressure plate to clamp said members together and a Belleville washer spring to move said pressure plate towards clutch engaging position, said Belleville washer spring having an inherent, substantially zero rate, within its operating range.

5. In a clutch mechanism, a driving member, a driven member, a Belleville washer spring yieldingly urging the driving member and the driven member into driving engagement, a clutch lever to control the engagement and disengagement of the driving and driven members, and manual and speed responsive means differentially controlling the position of the clutch lever.

6. In a clutch mechanism, a driving member, a driven member, a pressure plate mounted to rotate with the driving member but movable into and out of engagement with the driven member to engage and disengage the clutch, Belleville washer spring means tending to urge the pressure plate into driving engagement with the driven member, a clutch lever, one end thereof being in pivotal engagement with the pressure plate to control the movement thereof, a movable abutment for the other end of the clutch lever, a pivot for the clutch lever intermediate of its aforesaid ends, speed responsive means controlling the position of the pivot, and manual means controlling the position of the abutment.

7. In a clutch mechanism, a driving member, a driven member, a pressure plate mounted to rotate with the driving member but movable into and out of engagement with the driven member to engage and disengage the clutch, centrifugally actuated means including a flyweight having a centrifugal moment about an axis on the driving member, Belleville washer spring means between the flyweight and the pressure plate tending to urge the pressure plate into driving engagement with the driven member, said Belleville washer spring means reacting on the flyweight with a turning moment thereon in opposition to the centrifugal moment thereon, a clutch lever having one end in pivotal engagement with the pressure plate, a movable abutment for the other end of the clutch lever, and a pivotal connection between an intermediate part of the clutch lever and an auxiliary lever whose position is controlled by the position of the centrifugally actuated means.

8. A clutch mechanism according to claim 6 in which the movement of the speed responsive means with increasing speed thereof is yieldingly resisted by Belleville washer resilient means separate from the Belleville washer spring tending to urge the pressure plate into driving engagement with the driven member.

JOHN O. ALMEN.
ANDREW LASZLO.